March 6, 1928.
L. E. SPRAY
1,661,639
APPROACH INDICATION APPARATUS
Filed Oct. 24, 1923
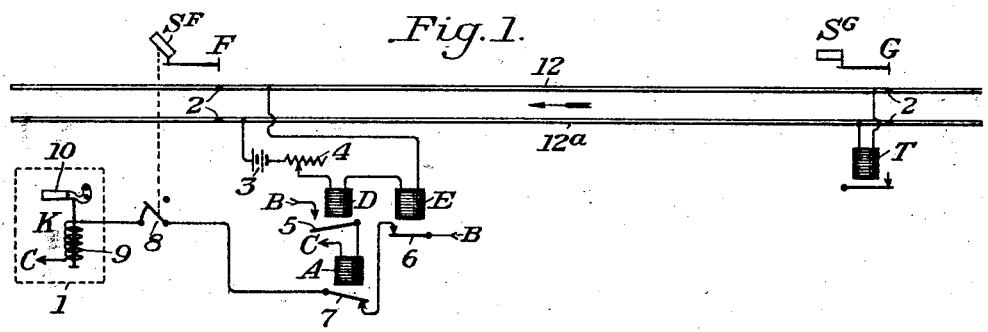
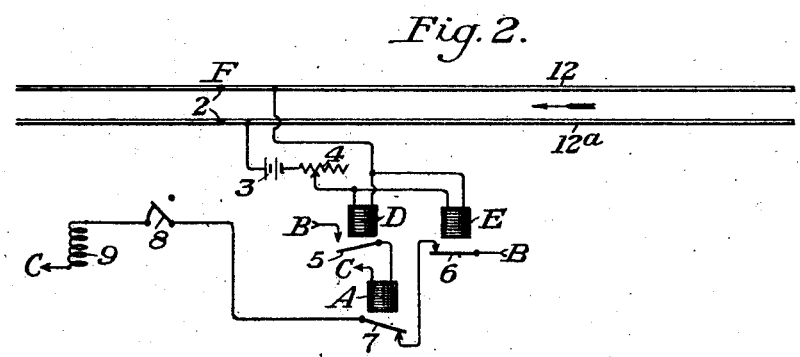
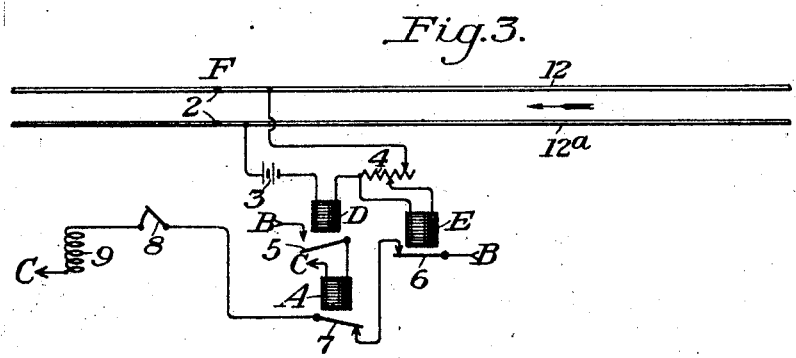
INVENTOR:
L. E. Spray,
by A. R. Wencke
His attorney Patented Mar. 6, 1928.

1,661,639

UNITED STATES PATENT OFFICE.

LESTER E. SPRAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

APPROACH-INDICATION APPARATUS.

Application filed October 24, 1923. Serial No. 670,464.

My invention relates to approach indication apparatus for railway trains, that is, to apparatus for indicating the approach of a train to a given point, such, for example, as an interlocking plant.

I will describe three forms of apparatus embodying my invention, and will then point out the novel features thereof in claims.

In the accompanying drawing, Fig. 1 is a diagrammatic view showing one form of apparatus embodying my invention. Figs. 2 and 3 are fragmentary views showing modifications of a portion of the apparatus shown in Fig. 1 and also embodying my invention.

Similar reference characters refer to similar parts in each of the three views.

Referring first to Fig. 1, the reference characters 12 and $12^a$ designate the track rails of a railway along which traffic normally moves in the direction indicated by the arrow. These rails are divided by insulated joints 2 to form a track section F—G. This section is provided with a track circuit comprising in the form here shown a track battery 3 connected across the rails at the left-hand end of the section, and a track relay T connected across the rails at the right-hand end of the section. Interposed between the battery 3 and the upper track rail 12 are an adjustable resistance 4, a relay D, and a second relay E, all three of which elements are connected in series with the battery 3 and so in series with the track circuit.

The relay D is so designed and adjusted that it is open when the track section F—G is unoccupied, but is closed when the section is occupied by a car or train. That is to say, when the section is unoccupied, the current which flows through relay D is not sufficient to close this relay because of the resistance of the track rails and of the track relay T. When a car or train occupies the section, however, the track relay T and a portion of each rail 12 and $12^a$ is shunted by the relatively low resistance path through the wheels and axles of the train, whereupon the current drawn from battery 3 is sufficient to close relay D.

Relay E, however, is so designed and adjusted that it is closed at all times, provided that the battery 3 and the track circuit are intact.

In the arrangement here shown the relay D controls a third relay A, the circuit for relay A including merely a front contact of relay D, so that relay A is de-energized whenever relay D is open, and energized whenever relay D is closed.

Located at a suitable point, such as in an interlocking tower 1, is an indicator K comprising in the form here shown a solenoid 9, controlling a semaphore 10 in such manner that when the solenoid is energized the semaphore is in its horizontal position, indicating "no train approaching," whereas when the solenoid is de-energized, the semaphore moves by gravity to an inclined position wherein it indicates "train approaching." The solenoid 9 is provided with a circuit which passes from terminal B of a suitable source of current, through front contact 6 of relay E, back contact 7 of relay A, a circuit controller 8 operated by a signal $S^F$, and solenoid 9 to the other terminal C of the same source of current. Circuit controller 8 is closed whenever signal $S^F$ indicates proceed or caution, but open when the signal indicates stop.

The operation of the apparatus shown in Fig. 1, is as follows:

When the section F—G is unoccupied, relay D is open, so that relay A is open, and, consequently, solenoid 9 is energized and the semaphore 10 indicates "no train approching." When a train enters section F—G, however, relay D will close, thereby closing relay A, so that the circuit for solenoid 9 will become open at contact 7. Semaphore 10 will then indicate "train approaching."

In the absence of relay E, it will be observed that when the section F—G is occupied by a train if a rail should be broken in front of such train, or if battery 3 should fail, or if for any other reason the track circuit between the battery and the train should not be intact, relay D would be open, relay A would be de-energized, and the semaphore 10 would falsely indicate "no train approaching." With relay E included in the track circuit, however, if the track circuit should fail for any of the reasons pointed out above or for any other reason while the section F—G is occupied by a train this relay E will be open so that the circuit for solenoid 9 will be open at contact 6 and semaphore 10 will indicate "train approaching."

In Fig. 2 the apparatus is the same as that shown in Fig. 1, except that relay E is connected in multiple with relay D. Relay D is still adjusted to be closed only when section F—G is occupied by a train, whereas relay E is still adjusted to be closed at all times provided the track circuit is intact.

In Fig. 3 the apparatus is the same as that in Fig. 1, except that relay E is connected in multiple with a portion of the adjustable resistance 4. The relays D and E in Fig. 3 are adjusted to operate in the manner set forth above in discussing Fig. 1.

Although I have herein shown and described only three forms of apparatus embodying my invention, it is understood that various changes and modifications may be made therein within the scope of the appended claims without departing from the spirit and scope of my invention.

Having thus described my invention, what I claim is:

1. In combination, a section of railway track, a track circuit for said section including a source of current and a track relay, a second relay interposed between said source and one rail and so adjusted that it is open when the section is unoccupied and closed when the section is occupied by a train, a third relay interposed between said source and a track rail and so adjusted that it is closed at all times provided said track circuit is intact, and an indicator controlled jointly by said second and third relays.

2. In combination, a section of railway track, a track circuit for said section including a source of current and a track relay, a second relay interposed between said source and one rail and so adjusted that it is open when the section is unoccupied and closed when the section is occupied by a train, a third relay interposed between said source and a track rail and so adjusted that it is closed at all times provided said track circuit is intact, an indicator, and means for causing said indicator to indicate "no train approaching" when said second relay is open and said third relay is closed, and "train approaching" when said second relay is closed or said third relay is open.

3. In combination, a section of railway track, a track circuit for said section, a relay associated with said track circuit and adjusted to be open when the section is unoccupied and closed when the section is occupied by a train, an indicator controlled by said relay in such manner as to indicate "no train approaching" when the relay is open and "train approaching" when the relay is closed, and means associated with said track circuit for causing said indicator to indicate "train approaching" in the event of failure of said track circuit.

4. In combination, a section of railway track, a track circuit for said section, a relay associated with said track circuit and adjusted to be open when the section is unoccupied and closed when the section is occupied by a train, an indicator controlled by said relay in such manner as to indicate "no train approaching" when the relay is open and "train approaching" when the relay is closed, a second relay associated with said track circuit and adjusted to be closed at all times provided said track circuit is intact, and means for causing said indicator to indicate "train approaching" when said second relay is open.

5. In combination, a section of railway track, a track circuit for said section, a relay associated with said track circuit and adjusted to be open when the section is unoccupied and closed when the section is occupied by a train, a second relay associated with said track circuit and adjusted to be closed at all times provided said track circuit is intact, and an indicator controlled jointly by said two relays.

6. In combination, a section of railway track, a track circuit for said section, a relay associated with said track circuit and adjusted to be open when the section is unoccupied and closed when the section is occupied by a train, a second relay interposed between the source of current and a track rail of said track circuit and adjusted to be closed at all times provided the track circuit is intact, and an indicator controlled jointly by said two relays.

7. In combination, a section of railway track, a track circuit for said section, a relay associated with said track circuit and adjusted to be open when the section is unoccupied and closed when the section is occupied by a train, a second relay connected in multiple with the first relay and adjusted to be closed at all times provided the track circuit is intact, and an indicator controlled jointly by said two relays.

In testimony whereof I affix my signature.

LESTER E. SPRAY.